(No Model.)
M. FLATHER.
HAND REAMING MACHINE.
No. 273,976. Patented Mar. 13, 1883.
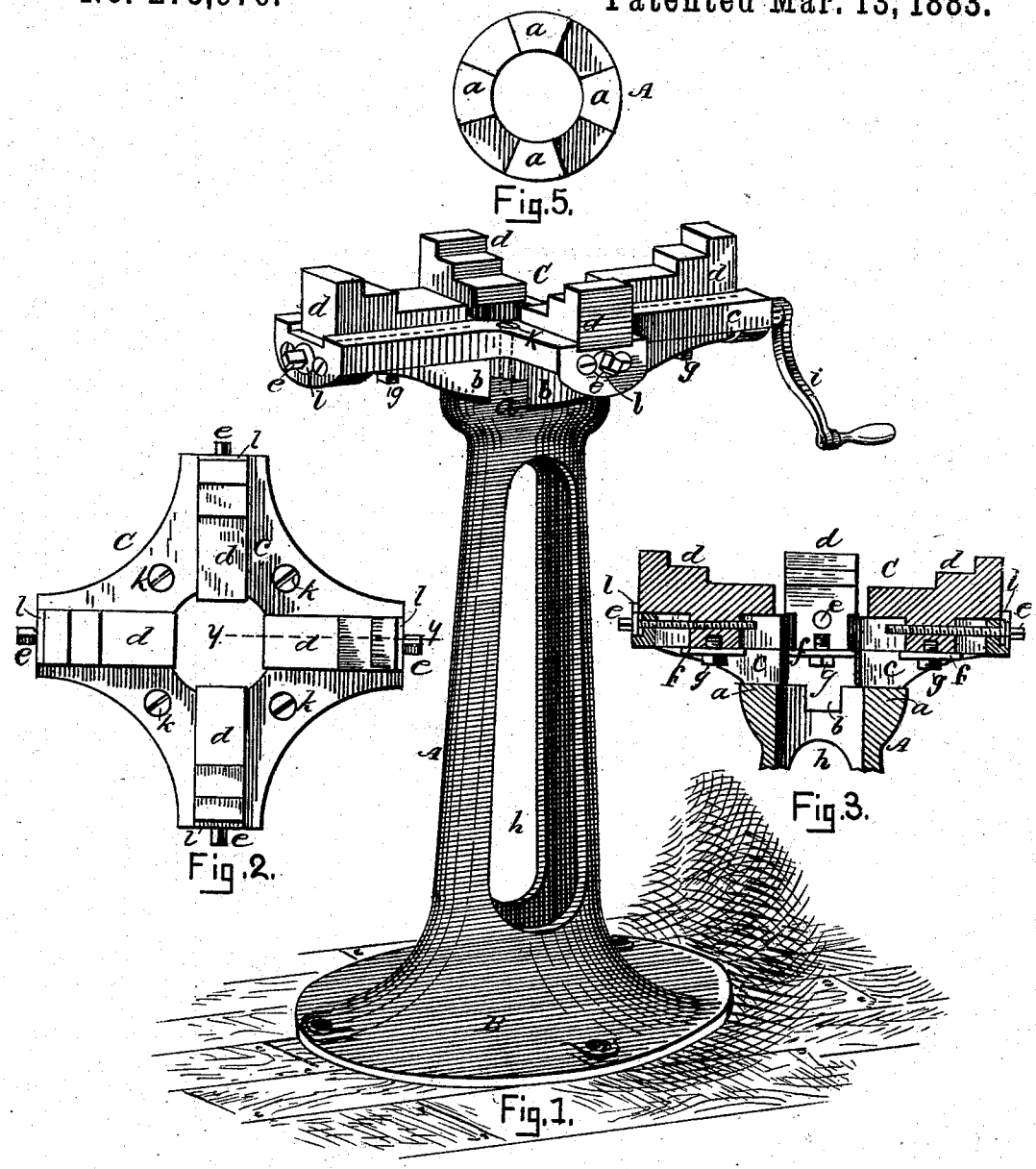
Witnesses:
H. E. Remick
Eugene Humphrey
Inventor:
Mark Flather,
By Porter & Hutchinson,
Attys.

UNITED STATES PATENT OFFICE.

MARK FLATHER, OF NASHUA, NEW HAMPSHIRE.

HAND REAMING-MACHINE.

SPECIFICATION forming part of Letters Patent No. 273,976, dated March 13, 1883.

Application filed November 27, 1882. (No model.)

*To all whom it may concern:*

Be it known that I, MARK FLATHER, of Nashua, State of New Hampshire, have invented an Improved Hand Reaming-Machine, of which the following is a specification.

This invention relates to a machine adapted to hold pulleys and other articles while being reamed or tapped by hand, which articles cannot well be held in a vise, and in reaming which it is necessary that the workman may pass freely around the same; and the invention will, in connection with the accompanying drawings, be hereinafter fully described, and specifically defined in the appended claims.

Figure 1 is a perspective view of my machine complete. Fig. 2 is a top or plan view thereof, but not showing the projecting portion of the base. Fig. 3 is a vertical section taken on line Y Y, Fig. 2, through the chuck, and showing the upper portion of the supporting-standard. Fig. 4 is an inverted or under side plan view of the central portion of the chuck or holding portion of my machine. Fig. 5 is a top or plan view of the head or top of the supporting-standard, and showing its indented line by which it is interlocked with the chuck.

In these views, A represents the standard, and B the base thereof, by which it is secured in position upon the floor. The head of the standard is preferably formed with four teeth or projections, $a$, as shown in detached Fig. 5, while the chuck C is formed with four similar teeth, $b$, which fit closely between the teeth $a$ of standard A, whereby the teeth of the chuck and standard are interlocked in order that they may receive and resist the circumferential strain to which the chuck is subjected when in use. Standard A is formed hollow, with an elongated opening, $h$, through the shell, on opposite sides thereof, as shown, in order to facilitate the removal of the reamers after they have passed down through the article in which they have been used.

Chuck C is formed in any of the well-known modes of construction; but I prefer that shown, which is the common independent four-jawed chuck, in which $c$ is the bed, and $d\ d\ d\ d$ are the jaws, which are seated in bed $c$, and are actuated by screws $e$, which are formed with a concentric collar seated in a recess in bed $c$, and held from lineal displacement by an inserted collar, $l$, and are threaded in a projection of the jaws in the well-known manner, the outer ends of said screws $e$ being formed with a rectangular cross-section, by which to actuate them by wrench $i$ or similar means. A plate, $f$, secured to the under side of the projection of jaws $d$ by a screw-bolt, $g$, moves upon ways formed in bed $c$, and holds the jaws in their respective grooves. The chuck and standard are secured together by screws $k$, which are countersunk or counterbored in bed $c$, and are threaded in the standard, as shown by dotted lines.

The chuck proper, in so far as relates to its holding-jaws and the connection thereof with bed $c$, and the means of actuating the jaws, are old and well known, and I make no claim thereto; nor is this particular form of chuck or any specific kind essential to my invention.

For many jobs of hand-reaming, and especially for reaming the larger sizes of pulleys, it is exceedingly inconvenient and difficult to hold the same in a vise, so much so that chucks have in some instances been fastened upon a bench for the purpose; but they are entirely unsatisfactory, especially when reaming articles which require the services of two men—one at each end of the reamer, wrench, or lever—when it is necessary for the workmen to move in circles around the pulley, and hence I have invented my machine, which consists in a chuck secured in horizontal position upon a pillar or supporting-frame, which is self-contained and adapted to be secured to the floor in any desired position to allow free passage to the workman on all sides of and around the same, and with an axial passage through the bed of the chuck and pillar for the reamer, and an opening in the side of the pillar for the removal of the same after it has performed its work.

Except for convenience of construction and repairs and reduction of cost of the machine, the standard A and bed $c$ of the chuck could be formed as an entire casting; but the forming them separately, and uniting them in the manner shown and described, possesses decided advantages over the method of forming them as an entirety.

I claim as my invention—

1. The chuck C, jointly with the standard A, the one mounted upon the other, substantially as shown and described.

2. The improved standard A, having the slot or opening $h$, substantially as described.

3. The chuck C and standard A, jointly formed respectively with teeth $a$ and $b$, arranged to interlock and resist the torsional strain applied to the chuck when in use, substantially as specified.

MARK FLATHER.

Witnesses:
GEORGE E. GAGE,
H. C. GREENWOOD.